US010718883B2

(12) United States Patent
Galliano et al.

(10) Patent No.: US 10,718,883 B2
(45) Date of Patent: Jul. 21, 2020

(54) SUBTERRANEAN FORMATION CHARACTERIZATION USING MICROELECTROMECHANICAL SYSTEM (MEMS) DEVICES

(71) Applicant: Halliburton Energy Services, Inc., Houston, TX (US)

(72) Inventors: Clinton Cheramie Galliano, Houma, LA (US); Mathew Dennis Rowe, Lafayette, LA (US); Walter Varney Andrew Graves, Lafayette, LA (US)

(73) Assignee: Halliburton Energy Services, Inc., Houston, TX (US)

( * ) Notice: Subject to any disclaimer, the term of this patent is extended or adjusted under 35 U.S.C. 154(b) by 360 days.

(21) Appl. No.: 15/531,511

(22) PCT Filed: Dec. 30, 2014

(86) PCT No.: PCT/US2014/072768
§ 371 (c)(1),
(2) Date: May 30, 2017

(87) PCT Pub. No.: WO2016/108849
PCT Pub. Date: Jul. 7, 2016

(65) Prior Publication Data
US 2017/0322341 A1 Nov. 9, 2017

(51) Int. Cl.
*G01V 11/00* (2006.01)
*E21B 49/00* (2006.01)
(Continued)

(52) U.S. Cl.
CPC .......... *G01V 11/002* (2013.01); *E21B 21/003* (2013.01); *E21B 43/26* (2013.01); *E21B 47/12* (2013.01); *E21B 49/00* (2013.01)

(58) Field of Classification Search
CPC ...... E21B 47/0005; E21B 47/12; E21B 33/13; E21B 43/25; E21B 47/01; E21B 47/122; E21B 47/10; G01V 11/002
See application file for complete search history.

(56) References Cited

U.S. PATENT DOCUMENTS

| 5,111,880 A | 5/1992 | Wittrisch et al. |
| 6,189,621 B1 | 2/2001 | Vail, III |

(Continued)

FOREIGN PATENT DOCUMENTS

| CN | 203769770 | 8/2014 |
| WO | 01/04460 | 1/2001 |

OTHER PUBLICATIONS

International Search Report and Written Opinion for PCT Patent Application No. PCT/US2014/072768, dated Sep. 10, 2015; 15 pages.

(Continued)

*Primary Examiner* — Randy W Gibson
*Assistant Examiner* — Gedeon M Kidanu
(74) *Attorney, Agent, or Firm* — Baker Botts L.L.P.

(57) ABSTRACT

Systems and methods for formation characterization in a subterranean formation are disclosed. A set of microelectromechanical system (MEMS) devices may be disposed in a circulating fluid. Each MEMS device in the set may have a machine-scannable designator. A MEMS scanner may be configured to scan the designator of a MEMS device in response to circulation of the circulating fluid in a wellbore surrounded by the formation. A MEMS analysis subsystem communicatively coupled with the MEMS scanner may store the designator of each MEMS device in the set, detect a subset of MEMS device by receiving the designators of (Continued)

MEMS devices from the MEMS scanner, and determine a characteristic of the formation based on the subset of MEMS devices.

20 Claims, 6 Drawing Sheets

(51) Int. Cl.
*E21B 47/12* (2012.01)
*E21B 43/26* (2006.01)
*E21B 21/00* (2006.01)

(56) References Cited

U.S. PATENT DOCUMENTS

| | | | |
|---|---|---|---|
| 6,241,028 B1 | 6/2001 | Bijleveld et al. | |
| 6,324,904 B1 | 12/2001 | Ishikawa et al. | |
| 6,745,833 B2 | 6/2004 | Aronstam et al. | |
| 6,898,529 B2 | 5/2005 | Gao et al. | |
| 6,995,677 B2 | 2/2006 | Aronstam et al. | |
| 7,017,662 B2 | 3/2006 | Schultz et al. | |
| 7,082,993 B2 | 8/2006 | Ayoub et al. | |
| 7,224,642 B1 | 5/2007 | Tran | |
| 7,455,108 B2 | 11/2008 | Jenkins et al. | |
| 7,520,160 B1 | 4/2009 | Toribio et al. | |
| 7,673,679 B2 | 3/2010 | Harrison et al. | |
| 7,675,816 B2 | 3/2010 | Mathiszik et al. | |
| 7,712,527 B2* | 5/2010 | Roddy | E21B 47/12 166/250.14 |
| 7,750,808 B2 | 7/2010 | Masino et al. | |
| 7,842,152 B2 | 11/2010 | Hamilton et al. | |
| 8,162,050 B2* | 4/2012 | Roddy | E21B 33/13 166/250.14 |
| 8,172,007 B2 | 5/2012 | Dolman et al. | |
| 8,173,955 B2 | 5/2012 | Kalb | |
| 8,291,975 B2* | 10/2012 | Roddy | E21B 47/01 166/250.1 |
| 2004/0226715 A1 | 11/2004 | Willberg et al. | |
| 2005/0183858 A1 | 8/2005 | Ayoub et al. | |
| 2007/0132591 A1 | 6/2007 | Khatri | |
| 2007/0256830 A1 | 11/2007 | Entov et al. | |
| 2008/0007421 A1* | 1/2008 | Liu | G01V 11/002 340/853.3 |
| 2009/0033516 A1 | 2/2009 | Alteirac et al. | |
| 2009/0087912 A1 | 4/2009 | Ramos et al. | |
| 2010/0139386 A1* | 6/2010 | Taylor | E21B 47/0003 73/152.23 |
| 2010/0294480 A1 | 11/2010 | Lavrut et al. | |
| 2010/0307786 A1 | 12/2010 | Kohl et al. | |
| 2011/0191028 A1 | 8/2011 | Ross et al. | |
| 2011/0192592 A1* | 8/2011 | Roddy | E21B 47/01 166/250.01 |
| 2011/0192598 A1* | 8/2011 | Roddy | E21B 33/13 166/253.1 |
| 2011/0277994 A1 | 11/2011 | Tambini et al. | |
| 2012/0090835 A1 | 4/2012 | Kefi | |
| 2012/0091561 A1 | 4/2012 | Van Velzen et al. | |
| 2012/0146648 A1 | 6/2012 | Eick et al. | |
| 2013/0110401 A1 | 5/2013 | Hsu et al. | |
| 2013/0118733 A1 | 5/2013 | Kumar | |
| 2013/0197810 A1 | 8/2013 | Haas et al. | |
| 2014/0024073 A1 | 1/2014 | Zhdaneev et al. | |
| 2014/0083768 A1 | 3/2014 | Moriarty et al. | |
| 2014/0111349 A1 | 4/2014 | Roberson et al. | |
| 2014/0212986 A1 | 7/2014 | Angelescu et al. | |
| 2016/0312551 A1* | 10/2016 | Rowe | E21B 47/00 |

OTHER PUBLICATIONS

Where does this borehole go?, Retrieved from: http://www.gyro-services.com/PDF/GyroServices-Bohrung-E.pdf, 2014; 2 pages.
International Search Report and Written Opinion for PCT Patent Application No. PCT/US2014/072774, dated Sep. 30, 2015; 14 pages.
Office Action for Canadian Patent Application No. 2969234, dated May 25, 2018; 5 pages.

* cited by examiner

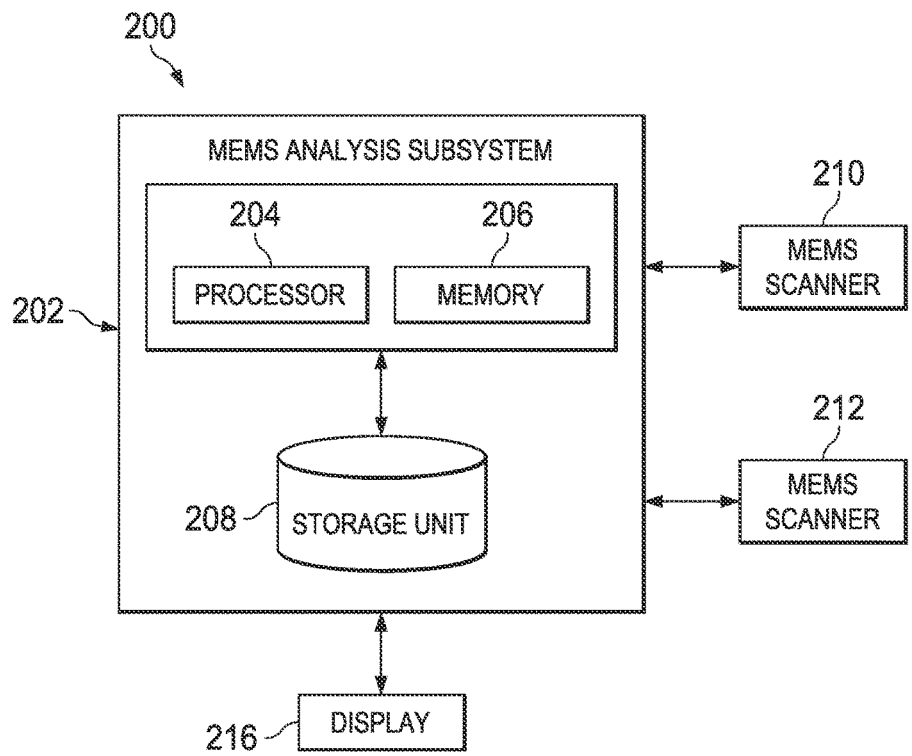
FIG. 2
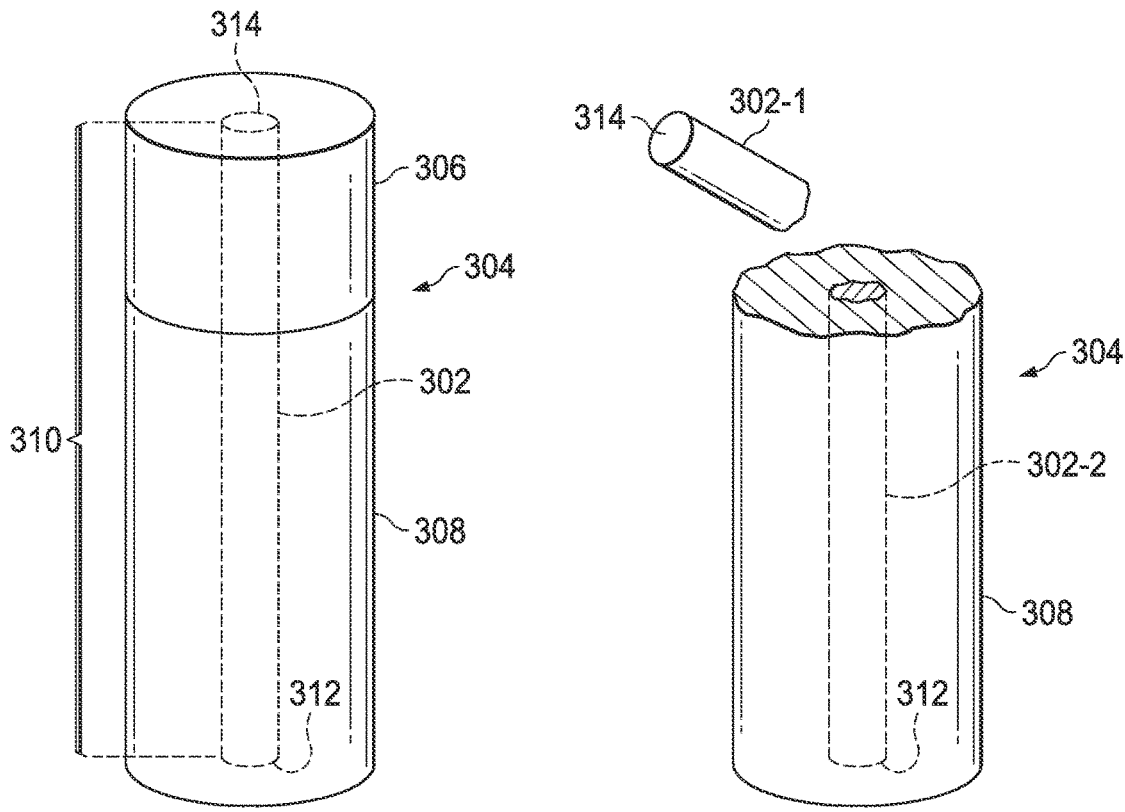
FIG. 3A
FIG. 3B

US 10,718,883 B2

SUBTERRANEAN FORMATION CHARACTERIZATION USING MICROELECTROMECHANICAL SYSTEM (MEMS) DEVICES

RELATED APPLICATIONS

This application is a U.S. National Stage Application of International Application No. PCT/US2014/072768 filed Dec. 30, 2014, which designates the United States, and which is incorporated herein by reference in its entirety.

TECHNICAL FIELD

The present disclosure relates generally to subterranean hydrocarbon production and, more particularly, to characterizing subterranean formations using microelectromechanical system (MEMS) devices.

BACKGROUND

Natural resources, such as hydrocarbons and water, are commonly obtained from subterranean formations that may be located onshore or offshore. The development of subterranean operations and the processes for removing natural resources typically involve a number of different steps such as, for example, drilling a borehole at a desired well site, treating the borehole to optimize production of the natural resources, and performing the necessary steps to produce and process the natural resources from the subterranean formation.

Subterranean operations may be facilitated by characterizing or obtaining information about the subterranean formation. For example, it may be desirable to characterize fractures within the subterranean formation or to obtain information about various characteristics such as formation temperature, chemistry, or nuclear radiation. However, because the formation may be deep underground and subject to extremes in temperature, pressure, and acoustic vibration, traditional information gathering techniques may not be practical or possible.

BRIEF DESCRIPTION OF THE DRAWINGS

For a more complete understanding of the present disclosure and its features and advantages, reference is now made to the following description, taken in conjunction with the accompanying drawings, in which:

FIG. 2 is a block diagram of an exemplary MEMS analysis subsystem coupled to exemplary MEMS scanners for use in a formation characterization system;

FIG. 3A is an exemplary MEMS device encapsulated by an exemplary capsule;

FIG. 3B is an exemplary MEMS device partially encapsulated by an exemplary capsule which has degraded;

DETAILED DESCRIPTION

The present disclosure describes systems and methods for characterizing a subterranean formation to facilitate hydrocarbon production. Determining temperature, chemical, nuclear radiation, and/or other characteristics of a formation may facilitate good decision making in relation to subterranean operations. Additionally, certain formations may include fractures that form and/or develop while hydrocarbon production is ongoing. Because fractures and various abnormalities in formation characteristics may introduce risk, expense, and/or other undesirable elements to hydrocarbon production, it may be desirable to plug fractures to isolate a wellbore from the surrounding formation and/or to determine the characteristics so that proper measures may be taken to address abnormalities.

A subterranean formation may be characterized by small devices configured to carry and/or detect information as they circulate through the formation. When information carried and/or detected by the devices is received and analyzed, characteristics of the formation may be determined. For example, microelectromechancial system (MEMS) devices may be adapted to circulate through the formation and to carry and/or detect information. Certain MEMS devices may have a machine-scannable designator to allow a MEMS scanner to identify the MEMS devices wirelessly and/or from some distance. When built to be sufficiently rugged for subterranean conditions, MEMS devices may be disposed in a circulating fluid and may be circulated in a wellbore with the circulating fluid to facilitate characterizing a formation. For example, MEMS devices may facilitate detecting that fractures exist, determining approximate sizes of the fractures, determining approximate locations of the fractures, determining whether the fractures are breathing fractures, and so on. In other examples, MEMS devices may be affected by formation characteristics such as temperatures, chemical properties, or nuclear radiation. Determining the effects of such formation characteristics on the MEMS devices may reveal information about these characteristics of the formation. Embodiments of the present disclosure and its advantages may be understood by referring to FIGS. 1 through 6, where like numbers are used to indicate like and corresponding parts.

Figure 1:
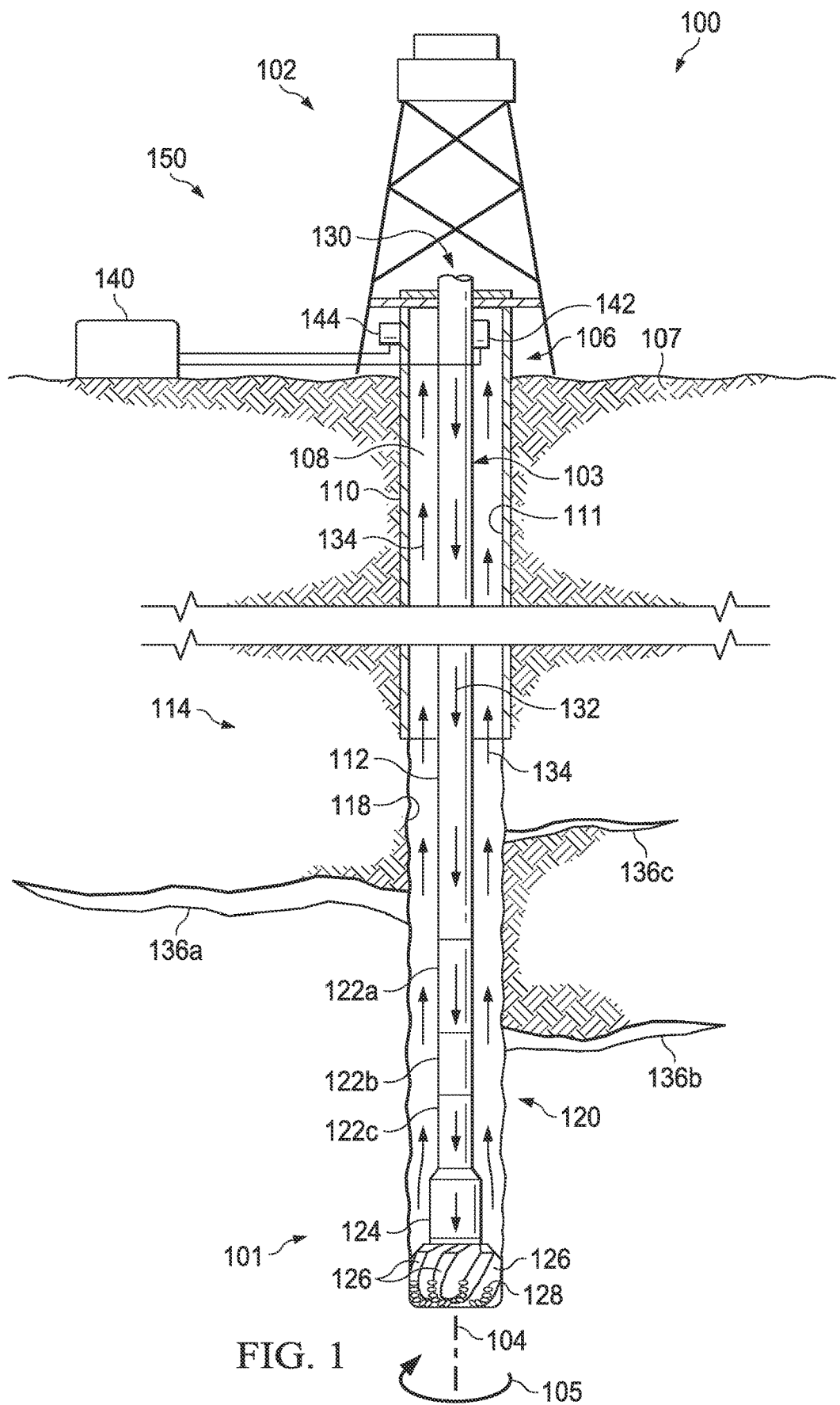
FIG. 1 is an exemplary formation characterization system associated with a drilling system.

FIG. 1 illustrates an exemplary formation characterization system associated with a drilling system. Although the present disclosure describes formation characterization systems integrated with drilling systems, persons of skill in the art will recognize that formation characterization systems may exist in any suitable context and at any stage of subterranean hydrocarbon production. For example, in some embodiments, formation characterization systems may be associated with hydrocarbon production in completed wellbores and may thus be integrated with well systems having additional, fewer, or different elements than those described herein in reference to drilling system 100. Moreover, although a single formation characterization system 150 is shown in FIG. 1, two or more formation characterization systems or may be associated with a single drilling system.

As shown in FIG. 1, drilling system 100 may include well surface or well site 106. Various types of drilling equipment such as a rotary table, circulating fluid pumps and circulating fluid tanks (not expressly shown) may be located at well surface or well site 106. For example, well site 106 may include drilling rig 102 that may have various characteristics and features associated with a "land drilling rig." However, downhole drilling tools incorporating teachings of the present disclosure may be satisfactorily used with drilling equipment located on offshore platforms, drill ships, semi-submersibles, and drilling barges (not expressly shown).

Drilling system 100 may also include drill string 103 associated with drill bit 101 that may be used to form a wide variety of wellbores or bore holes within subterranean formation 107 such as generally vertical wellbore 114, a generally horizontal wellbore (not shown), a directional wellbore (not shown), or any combination thereof.

Bottom Hole Assembly (BHA) 120 may be formed from a wide variety of components configured to form wellbore 114. For example, components 122a, 122b and 122c of BHA 120 may include, but are not limited to, drill bits (e.g., drill bit 101), coring bits, drill collars, rotary steering tools, directional drilling tools, downhole drilling motors, reamers, hole enlargers or stabilizers. The number and types of components 122 included in BHA 120 may depend on anticipated downhole drilling conditions and the type of wellbore that will be formed by drill string 103 and rotary drill bit 101. BHA 120 may also include various types of well logging tools (not expressly shown) and other downhole tools associated with directional drilling of a wellbore. Further, BHA 120 may also include a rotary drive (not expressly shown) connected to components 122a, 122b and 122c and which rotates at least part of drill string 103 together with components 122a, 122b and 122c.

Drilling system 100 may also include rotary drill bit ("drill bit") 101. Drill bit 101 may include one or more blades 126 that may be disposed outwardly from exterior portions of rotary bit body 124 of drill bit 101. Blades 126 may be any suitable type of projections extending outwardly from rotary bit body 124. Drill bit 101 may rotate with respect to bit rotational axis 104 in a direction defined by directional arrow 105. Blades 126 may include one or more cutting elements 128 disposed outwardly from exterior portions of each blade 126. Drill bit 101 may have many different designs, configurations, and/or dimensions according to the particular application of drill bit 101.

Wellbore 114 may be defined in part by casing string 110 that may extend from well surface 106 to a selected downhole location. Portions of wellbore 114, as shown in FIG. 1, that do not include casing string 110 may be described as "open hole." Various types of circulating fluid may be pumped from well surface 106 through drill string 103 to attached drill bit 101. Circulating fluid may be pumped into drill string 103 at fluid injection point 130. Circulating fluid may flow from fluid injection point 130 through drill string 103 in a downhole direction as illustrated by fluid flow 132. At drill bit 101, the circulating fluid may pass through nozzles of drill bit 101 to be ejected into wellbore 114. The circulating fluid may then be circulated back to well surface 106 through annulus 108 as illustrated by fluid flow 134. As shown, annulus 108 may be defined in part by outside diameter 112 of drill string 103 and inside diameter 118 of wellbore 114. Inside diameter 118 may be referred to as the "sidewall" of wellbore 114. Annulus 108 may also be defined by outside diameter 112 of drill string 103 and inside diameter 111 of casing string 110.

As shown, elements of formation characterization system 150 may be integrated with drilling system 100. In certain embodiments, MEMS analysis subsystem 140 may be located at or near well site 106. MEMS analysis subsystem 140 may be communicatively coupled with MEMS scanner 142, which may also be located near well site 106. In other embodiments, MEMS analysis subsystem 140, MEMS scanner 142, and/or one or more components thereof may be located elsewhere, such as downhole within wellbore 114. For example, MEMS scanner 142 may be permanently located at a fixed point in wellbore 114 or may be associated with drill string 103 or BHA 120. By communicating with MEMS scanner 142, MEMS analysis subsystem 140 may compile data representing a set of MEMS devices that have entered or are located within wellbore 114. For example, MEMS analysis subsystem 140 may store data associated with a designator of each MEMS device disposed in the circulating fluid as the MEMS devices enter wellbore 114 (e.g., by entering drill string 103).

As shown, MEMS analysis subsystem 140 may also be communicatively coupled with MEMS scanner 144. MEMS scanner 144 may also be at or near well site 106, as shown, downhole within wellbore 114, or in any suitable location. For example, MEMS scanner 144 may be located at a position on well surface 106 where circulating fluid emerges from wellbore 114 after circulating through wellbore 114 (e.g., by emerging from annulus 108). As such, in various embodiments, MEMS scanner 144 may be located apart from MEMS scanner 142, near MEMS scanner 142, or may even be integrated with MEMS scanner 142. By communicating with MEMS scanner 144, MEMS analysis subsystem 140 may receive information about a subset of MEMS devices that emerge from wellbore 114 in response to circulation of the circulating fluid in wellbore 114. In response, MEMS analysis subsystem 140 may determine that certain MEMS devices in the subset have been affected by temperature, radiation, or chemical properties of the formation due to changes in the designator detected as compared to when the designator was scanned by MEMS scanner 142. In other examples, MEMS analysis subsystem 140 may determine that the subset of MEMS devices received is different from the set of MEMS devices sent downhole. Accordingly, MEMS analysis subsystem 140 may characterize one or more fractures within the formation by inferring that MEMS devices present in the set but missing from the subset were captured by fractures within formation 107.

As shown in FIG. 1, formation 107 may have one or more fractures. The fractures in formation 107 may be naturally occurring and inherent to formation 107, or created by drilling operations or other subterranean operations performed within wellbore 114. Fractures 136 (e.g., fractures 136a, 136b, and 136c) are shown within formation 107 in FIG. 1. While FIG. 1 shows only three fractures 136, additional or fewer fractures of any size may be present in formation 107. Fractures 136 are not drawn to scale relative to formation 107 or any elements of drilling system 100 or formation characterization system 150. However, relative size differences between fractures 136 may be reflected by the size of each fracture 136 as drawn. For example, as shown, fracture 136a may be a relatively large fracture. As such, fracture 136a may be of significant concern to operators associated with drilling system 100. Fracture 136b may be a medium-sized fracture. Fracture 136c may be a smaller fracture. Because of their sizes, fractures 136b and 136c may be of less concern to operators than fracture 136a. However, characterizing all three fractures 136 in formation 107 may be desirable so that downhole conditions may be comprehensively understood.

To characterize formation 107, including obtaining information about fractures 136, MEMS devices may be adapted to be carried by circulating fluid into formation 107 (e.g., by fluid flows 132 and 134 in wellbore 114). In some examples, MEMS devices will react to temperature, radiation, or chemical characteristics of the formation such that the designators of the MEMS devices will modified. Accordingly, as will be described in more detail below, MEMS analysis subsystem 140 may detect that certain MEMS devices have reacted to the characteristics of the formation due to the modified designators. In other examples, the MEMS devices may be carried into fractures 136 from wellbore 114 as part of the natural course of fluid flow 134 of the circulating fluid. Accordingly, certain MEMS devices may be removed, at least temporarily, from fluid flow 134 as the MEMS devices are captured by fractures 136 (e.g., by becoming stuck or otherwise disposed within fractures 136). Meanwhile, other MEMS devices may continue circulating in wellbore 114 to eventually emerge from wellbore 114 at well surface 106. Thus, as will be described in more detail below, MEMS analysis subsystem 140 may detect and/or otherwise characterize fractures 136 by inferring information from the set of MEMS devices that entered wellbore 114, the subset of MEMS devices that emerged from wellbore 114, and the MEMS devices missing from the subset because they were captured by fractures 136.

In certain embodiments, MEMS devices may be tracked by one or more MEMS scanners located along any portion of wellbore 114 while the MEMS devices are carried by fluid flows 132 and 134 throughout wellbore 114. For example, MEMS devices may be scanned by one or more MEMS scanners located along drill string 103 (not shown). In certain embodiments, one or more MEMS scanners may also be associated with a wireline employed within wellbore 114 (not shown).

FIG. 2 illustrates a block diagram of an exemplary MEMS analysis subsystem coupled to exemplary MEMS scanners for use in a formation characterization system. In FIG. 2, formation characterization system 200 may represent an embodiment of formation characterization system 150 described above with respect to FIG. 1. As shown, formation characterization system 200 may include MEMS analysis subsystem 202. MEMS analysis subsystem 202 may represent an embodiment of MEMS analysis subsystem 140, described above with respect to FIG. 1. Formation characterization system 200 may also include MEMS scanner 210 and MEMS scanner 212, which may respectively represent embodiments of MEMS scanner 142 and MEMS scanner 144, described above with respect to FIG. 1. Formation characterization system 200 may also include one or more displays 216. The elements shown in FIG. 2 are exemplary only and formation characterization system 200 may include fewer or additional elements.

MEMS scanners 210 and 212 may be configured to scan (e.g., read) and/or assign (e.g., write) machine-scannable designators of any suitable MEMS device. For example, MEMS scanners 210 and 212 may scan and or assign designators of passive MEMS devices. Passive MEMS devices may include no independent power supply but may receive any power needed (e.g., to read or write a designator or perform other functionality) wirelessly from electromagnetic fields supplied from MEMS scanners 210 and 212 or from another source. In some examples, passive MEMS devices may be magnetically encoded with the designator, which MEMS scanners 210 and 212 may be configured to scan.

MEMS scanners 210 and 212 may also be configured to scan and/or assign multi-unit designators. A unit of a multi-unit designator may include any suitable type of data. For example, a unit may be a bit (e.g., 0 or 1), an alphanumeric character encoded as one or more bytes, or any suitable number (e.g., a decimal, hexadecimal, or other number). A multi-unit designator may include a serial number and each unit of the multi-unit designator may be an individual digit or character of the serial number. The serial number may be unique or may otherwise help distinguish one designator associated with one MEMS device from other designators associated with other MEMS devices in the set disposed in the circulating fluid of formation characterization system 200. The designator may also include data indicative of particular features of the MEMS device. For example, certain units of a designator may include a serial number while other units include information about a size, shape, density, reactive sensitivity, and/or other characteristic of the MEMS device. The designator may also include time data such as a timestamp indicative of various events such as when MEMS scanner 210 scanned the MEMS device entering a wellbore, when MEMS scanner 212 scanned the MEMS device emerging from the wellbore, and/or other events associated with the MEMS device.

In certain embodiments, MEMS scanners 210 or 212 or another device (not shown) may dynamically write a designator to one or more MEMS devices as the set of MEMS devices disposed within the circulating fluid enters the wellbore (e.g., enters drill string 103, as shown in FIG. 1). For example, MEMS scanner 210 may be configured to assign each MEMS device a machine-scannable designator such as the designators described above. MEMS scanner 210 may dynamically assign the MEMS device a unique identification number and/or a timestamp as the MEMS device enters the wellbore. In certain examples, the designator of the MEMS device may also be altered. For example, the MEMS device may be preprogrammed with static information about physical characteristics of the MEMS device but may receive an identification number and/or a timestamp dynamically from a MEMS scanner or other device.

As shown in FIG. 2, MEMS scanners 210 and 212 may be communicatively coupled to MEMS analysis subsystem 202. Through this communicative coupling, MEMS analysis subsystem 202 may direct MEMS scanners 210 and 212 to perform various operations such as scanning and/or assigning designators of MEMS devices. MEMS analysis subsystem 202 may also receive information from MEMS scanners 210 and 212 regarding MEMS devices. For example, MEMS analysis subsystem 202 may receive the designators of a set of MEMS devices entering a wellbore from MEMS scanner 210, and the designators of a subset of MEMS devices emerging from the wellbore from MEMS scanner 212.

In response to receiving the designators from MEMS scanners 210 and 212, MEMS analysis subsystem 202 may analyze the designators to characterize a subterranean formation. To perform the analysis, MEMS analysis subsystem 202 may include various components. For example, as shown in FIG. 2, MEMS analysis subsystem 202 may include processor 204, memory 206, and storage unit 208 communicatively coupled one to another. Modifications, additions, or omissions may be made to MEMS analysis subsystem 202 without departing from the scope of the present disclosure. For example, MEMS analysis subsystem 202 illustrates one particular configuration of components, but any suitable configuration of components may be used. For example, components of MEMS analysis subsystem 202 may be implemented either as physical or logical components. Furthermore, in some embodiments, functionality associated with components of MEMS analysis subsystem 202 may be implemented with special and/or general purpose circuits or components. Components of MEMS analysis subsystem 202 may also be implemented by computer program instructions.

Processor 204 may include a microprocessor, microcontroller, digital signal processor (DSP), field programmable gate array (FPGA), application specific integrated circuit (ASIC), or any other digital or analog circuitry configured to interpret and/or execute program instructions and/or process data. Processor 204 may be configured to interpret and/or execute program instructions and/or data stored in memory 206. Program instructions or data may constitute portions of software for carrying out formation characterization as described herein. For example, program instructions may cause processor 204 to compare a set of MEMS devices that entered a wellbore and a subset of MEMS devices that emerged from the wellbore to determine that certain MEMS devices were removed from the flow of the circulating fluid because they were captured by a downhole fracture, or that the MEMS devices emerged in an unexpected order. Program instructions may further cause processor 204 to infer from the subset of MEMS devices that a fracture is present downhole and/or to determine a characteristic of the fracture such as an approximate size of the fracture, an approximate location (e.g. downhole depth) of the fracture, and/or whether the fracture is a breathing fracture. Various embodiments of characterizing fractures are described in more detail below. In other examples, program instructions may cause processor 204 to detect that particular units of some multi-unit designators of MEMS devices emerging from the wellbore are no longer machine-scannable, indicating that the MEMS devices may have reacted downhole with temperature, radiation, chemical, or other characteristics of the formation. Various embodiments of determining downhole characteristics are described in more detail below.

Memory 206 may include any system, device, or apparatus configured to hold one or more memory modules. For example, memory 206 may include read-only memory, random access memory, solid state memory, or disk-based memory. Each memory module may include any system, device or apparatus configured to retain program instructions and/or data for a period of time (e.g., computer-readable non-transitory media).

Storage unit 208 may provide and/or store any information that suits a particular embodiment. For example, storage unit 208 may store designators of the set of MEMS devices that enter the wellbore as detected by MEMS scanner 210. Storage unit 208 may also store designators of the subset of MEMS devices that emerge from the wellbore, as detected by MEMS scanner 212. Storage unit 208 may also store values associated with characteristics of the formation including characteristics of fractures within the formation, that may be derived or used by processor 204. Storage unit 208 may be implemented in any suitable manner, such as by functions, instructions, logic, or code, and may be stored in, for example, a relational database, file, application programming interface, library, shared library, record, data structure, service, software-as-service, or any other suitable mechanism. Storage unit 208 may include operational code such as functions, instructions, or logic.

MEMS analysis subsystem 202 may present, transfer, respond to, or otherwise use information obtained from the designators of the set and the subset of MEMS devices in any suitable way. For example, in some embodiments, MEMS analysis subsystem 202 may be communicatively coupled to display 216, whereby MEMS analysis subsystem 202 may present information obtained or inferred to onsite and/or offsite operators associated with the subterranean operations and hydrocarbon production. MEMS analysis subsystem 202 may produce a distribution plot or report that may be displayed on display 216 so that operators may be apprised as to whether an abnormal event has occurred. In other examples, MEMS analysis subsystem 202 may also be configured to automatically respond to formation characteristics that are determined by automatically altering parameters associated with wellbore 114, by setting off alarms, by communicating with real-time decision programs, and/or by responding in any other suitable manner.

Referring now to FIGS. 3A and 3B, collectively referred to as FIG. 3, particular embodiments of MEMS devices adapted for use in subterranean operations are illustrated. Specifically, FIG. 3A illustrates an exemplary MEMS device encapsulated by an exemplary capsule. As shown, MEMS device 302 is encapsulated by cylindrical capsule 304.

MEMS device 302 may be adapted for use in subterranean operations to facilitate hydrocarbon production. For example, MEMS device 302 may be a passive MEMS device and may be associated with a designator that may be machine-scannable from MEMS device 302 while MEMS device 302 is encapsulated in capsule 304. Specifically, MEMS device 302 may be configured to be machine-scannable by MEMS scanners 210 and 212, discussed above in reference to FIG. 2, as MEMS device 302 is disposed in circulating fluid that is entering a wellbore or emerging from the wellbore. MEMS device 302 may have similar or the same properties discussed in reference to other MEMS devices described above. For example, MEMS device 302 may be magnetically encoded with a multi-unit designator including a serial number. Specifically, the multi-unit designator including the serial number may be magnetically encoded along length 310 of MEMS device 302. In some examples, a first unit of the multi-unit designator may be machine-scannable even if a second unit of the multi-unit designator is not. For example, one or more units of the designator magnetically encoded toward bottom end 312 of MEMS device 302 may be machine-scannable even if other units of the designator encoded closer to top end 314 are not. In some embodiments, the one or more units encoded toward bottom end 312 may be machine-scannable even when a portion of MEMS device 302 toward top end 314 detaches from the rest of MEMS device 302.

Capsule 304 may also be adapted for use in subterranean operations in association with MEMS device 302. For example, capsule 304 may be adapted to withstand high temperature, pressure, acoustic vibration, and other extreme conditions common downhole that MEMS device 302 may not be able to withstand alone. As such, capsule 304 may protect MEMS device 302 as it is carried by circulating fluid through the wellbore. In various embodiments, capsule 304 may have a shape, size, and/or density that emulates fluids or solids found within the wellbore. Additional examples of capsules with different sizes, shapes, and densities are described below. In other embodiments, capsule 304 may simply imitate the size, shape, and/or density of the MEMS device it encapsulates, as illustrated in FIG. 3.

Capsule 304 may also be adapted for use in subterranean operations to facilitate hydrocarbon production by including one or more reactive parts and one or more nonreactive parts. For example, in FIG. 3A, capsule 304 includes reactive part 306 and nonreactive part 308. Reactive part 306 may be adapted to react to various characteristics within a subterranean formation. For example, the construction of reactive part 306 may employ polyamide chemistry to form reactive part 306 of one or more reactive polymeric materials that react to various characteristics of the formation.

Reactive part 306 may react to the temperature of the formation, nuclear radiation within the formation, particular chemical properties of the formation, acoustic vibrations within the formation, radio frequency electromagnetic radiation within the formation, and/or other suitable characteristics of the formation. For example, reactive part 306 may react to temperature by dissolving, softening, breaking down, or otherwise degrading when it is exposed to a temperature above a particular threshold. Similarly, reactive part 306 may degrade as a chemical reaction to particular chemical properties present in a formation or as a reaction to nuclear radiation present in the formation. When reactive part 306 reacts to a characteristic of the formation by degrading, a portion of MEMS device 302 encapsulated by reactive part 306 may become exposed. Because MEMS device 302 may not be adapted to withstand downhole conditions, the exposure of the portion of MEMS device 302 may cause MEMS device 302 to be affected or damaged.

As shown, capsule 304 may also include nonreactive part 308. Nonreactive part 308 may be nonreactive to one or more particular characteristics of the formation that reactive part 306 reacts to. For example, if reactive part 306 is configured to react to temperatures above a threshold, nonreactive part 308 may be configured to withstand temperatures above the threshold such that nonreactive part 308 does not react (e.g., degrade) while reactive part 306 does. In certain embodiments, nonreactive part 308 may react to certain characteristics of the formation that are different from the characteristics that reactive part 306 reacts to. For example, reactive part 306 may degrade when certain nuclear radiation is present while nonreactive part 308 may not react to the nuclear radiation. However, nonreactive part 308 may degrade in the presence of certain chemical properties of the formation while reactive part 306 may not react to the chemical properties. In certain examples, capsule 304 may have more than two parts as shown in FIG. 3. For example, capsule 304 may have a part that does not react to any formation characteristic, a part that is reactive to temperature characteristics, a part that is reactive to nuclear radiation characteristics, and a part that is reactive to chemical characteristics. In the same or other examples, a variety of capsules configured to react to different formation characteristics may be disposed within the circulating fluid together so that the different formation characteristics may each be detected.

FIG. 3B illustrates an exemplary MEMS device partially encapsulated by an exemplary capsule which has degraded. Specifically, as shown in FIG. 3B, reactive part 306 of capsule 304 has degraded, exposing a portion of MEMS device 302 toward top end 314 as illustrated by portion 302-1. Reactive part 306 may have degraded as a reaction to a temperature above a particular threshold, nuclear radiation, a chemical property of the formation, or another characteristic of the formation that reactive part 306 was designed to react to. As shown, after reactive part 306 degrades to expose portion 302-1, portion 302-1 is no longer encapsulated by capsule 304 while the portion of MEMS device 302 toward bottom end 312, illustrated by portion 302-2, continues to be encapsulated by nonreactive part 308 of capsule 304. MEMS device 302 may not be designed to withstand exposure to extreme conditions such as heat and pressure in the formation without protection from capsule 304. For example, turbulence or other extreme downhole conditions may cause MEMS device 302 to break such that portion 302-1 detaches from MEMS device 302, as shown. As a result of the exposure and/or the detachment of portion 302-1, one or more units of a multi-unit designator associated with portion 302-1 may become non-machine scannable by a MEMS scanner. For example, if ten units (e.g., digits) were magnetically encoded along length 310 of MEMS device 302 in FIG. 3A, three digits may be associated with portion 302-1 and seven digits may be associated with portion 302-2. The three digits associated with portion 302-1 may become non-machine-scannable when portion 302-1 is exposed and/or detaches. Consequently, when MEMS device 302 is scanned (e.g., when emerging from the wellbore), only seven of the original ten digits may scannable by the MEMS scanner.

The degrading of reactive part 306 and subsequent damage to or detachment of portion 302-1 of MEMS device 302 may reveal characteristics of the subterranean formation within a formation characterization system. For example, as generally described above in relation to FIG. 2, MEMS scanner 210, MEMS scanner 212, and MEMS analysis subsystem 202 may function cooperatively to determine the characteristic of the subterranean formation that reactive portion 306 reacted to. Specifically, in one embodiment, MEMS scanner 210 may detect 10 digits of MEMS device 302 as it enters the wellbore. Subsequently, MEMS device 302 may react to a chemical characteristic of the formation such that reactive part 306 degrades and portion 302-1 of MEMS device 302 detaches. After circulating back up to emerge from the wellbore, MEMS device 302 may only include portion 302-2 and, thus, MEMS scanner 212 may only scan 7 digits of MEMS device 302. MEMS analysis subsystem 202 may receive the 10 digit designator from MEMS scanner 210 and the 7 digit designator from MEMS scanner 212 and infer that each designator is associated with the same MEMS device 302, but that the MEMS device encountered the chemical characteristic of the formation and was damaged as a result. Accordingly, MEMS analysis subsystem 202 may infer that the chemical characteristic is present in the formation. Inferring information in this way may help characterize the formation.

Figure 4:
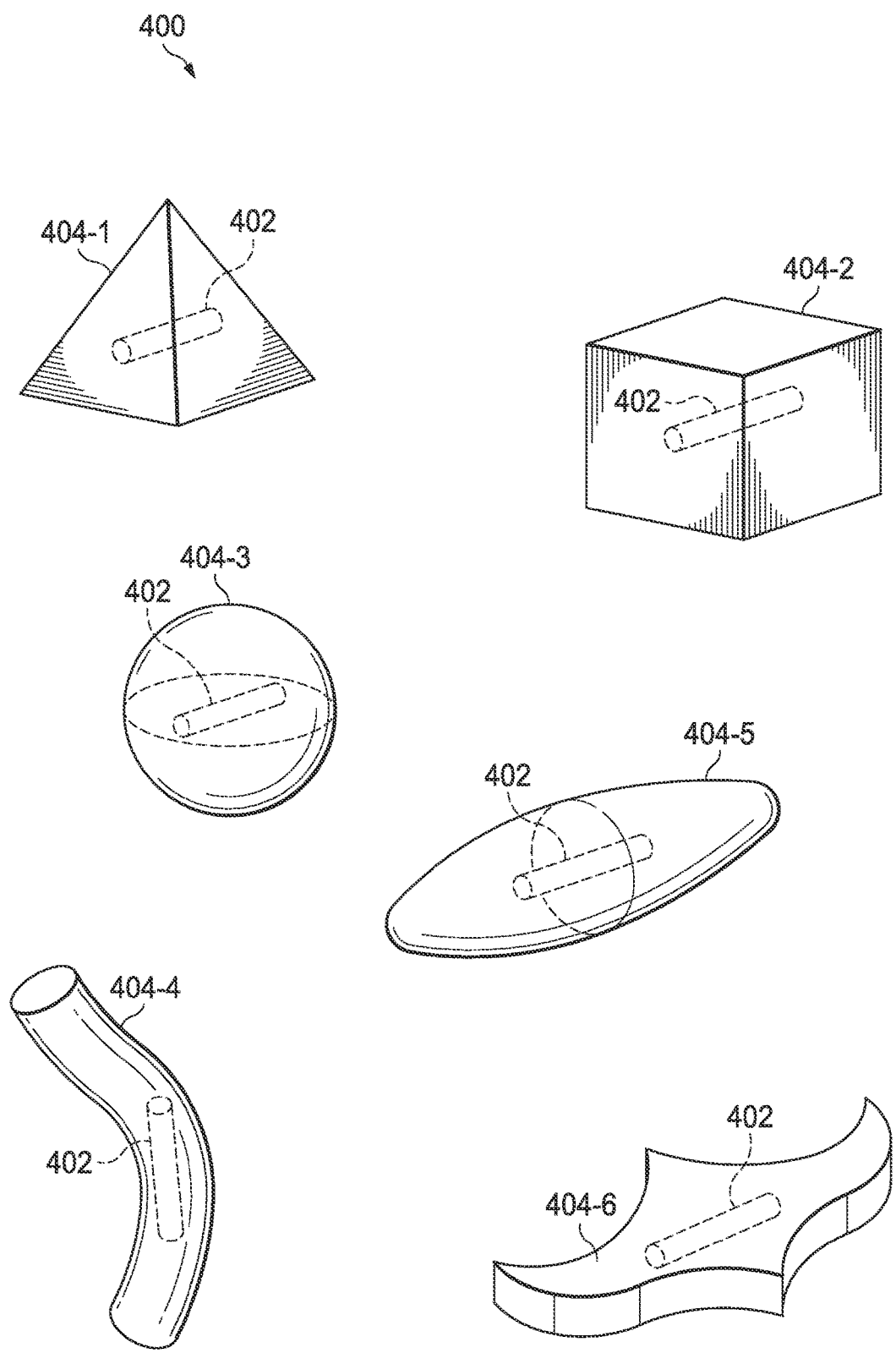
FIG. 4 is an exemplary set of MEMS devices encapsulated by exemplary capsules emulating physical attributes of fluids disposed downhole within a subterranean formation or solids disposed within the fluids.

FIG. 4 illustrates an exemplary set of MEMS devices encapsulated by exemplary capsules emulating physical attributes of fluids disposed downhole within a subterranean formation or solids disposed within the fluids. Specifically, set 400 of MEMS devices 402 includes a non-uniform assortment of capsules 404 (e.g., capsules 404-1 through 404-6), each capsule 404 encapsulating at least one MEMS device 402. Although only six MEMS devices 402 are illustrated as part of set 400 in FIG. 4, set 400 may include any number of MEMS devices that suits a particular embodiment. For example, set 400 may include dozens, hundreds, thousands, or more MEMS devices 402. In some examples, each MEMS device 402 may be encapsulated by the non-uniform assortment of capsules 404, as shown in FIG. 4. In other examples, set 400 may also include one or more freestanding MEMS devices that are not encapsulated by a capsule 404 (not shown).

MEMS devices 402 may be similar to MEMS device 302, described in relation to FIG. 3. For example, MEMS devices 402 may be adapted for use in subterranean operations, but may be encapsulated by capsules 404 to help MEMS devices 402 withstand extreme conditions (e.g., temperature, pressure, etc.) commonly encountered downhole within a subterranean formation. MEMS devices 402 may also be passive MEMS devices with multi-unit designators that may be machine-scannable from MEMS devices 402 while MEMS devices 402 are encapsulated in capsules 404. In various embodiments, MEMS devices 402 may be each be uniform or identical to one another in appearance and construction. For example, to take advantage of benefits associated with economies of scale from large-scale manufacturing, MEMS devices 402 may be manufactured to have uniform sizes, shapes, and densities. In other embodiments, MEMS devices 402 may vary and/or may be adapted to have particular physical qualities not shared by all other MEMS devices 402.

Capsules 404 may also be adapted for use in subterranean operations by having one or more of the attributes of capsule 304 described in relation to FIG. 3. For example, as shown, capsules 404 may each encapsulate a MEMS device 402 to protect MEMS devices 402 from extreme downhole conditions. As such, capsules 404 may be constructed of materials capable of withstanding the extreme conditions. In addition, capsules 404 may be configured to react to characteristics of the formation (e.g., temperature, chemical, nuclear, etc.) as described in relation to capsule 304.

Capsules 404 may include a wide assortment of sizes, shapes, and densities. For example, capsules 404 may be adapted to emulate physical attributes of various fluids disposed downhole within a subterranean formation (e.g., hydrocarbon fluids, water, circulating fluids, etc.) or solids disposed within the fluids (e.g., drill cuttings, lost circulation material ("LCM") solids, etc.), as will be described in more detail below. As shown in FIG. 4, each capsule 404 may have a different size, shape, density, and/or aspect ratio. For example, set 400 includes MEMS devices 402 encapsulated by pyramidal capsule 404-1, cubic capsule 404-2, spherical capsule 404-3, wire-like capsule 404-4, ellipsoidal capsule 404-5, and paper-like capsule 404-6. In other examples, an assortment of capsules including a plurality of each capsule type may be used. For example, set 400 may include dozens, hundreds, thousands, or more MEMS devices 402 encapsulated by a plurality of pyramidal capsules, a plurality of cubic capsules, a plurality of spherical capsules, a plurality of wire-like capsules, a plurality of ellipsoidal capsules, a plurality of paper-like capsules, and/or any combination of these or other types of capsules that suit a particular embodiment.

For purposes further detailed below in relation to FIGS. 5 and 6, capsules 404 may emulate one or more physical attributes associated with fluids disposed downhole during subterranean operations and solids disposed within the fluids. For example, capsules 404 may emulate a density of a fluid such as water, fluid hydrocarbons (e.g., oil, gas, etc.), and/or circulating fluids (e.g., drilling muds, production fluids, etc.). As such, capsules 404 may be constructed from ceramic, polymer, metal, glass, and/or any other suitable material that may have a density approximately emulating a fluid disposed downhole during the subterranean operations. In the same or other examples, capsules 404 may emulate solids disposed within the fluids. For example, capsules 404 may emulate drill cuttings from the formation as the wellbore within the formation is created or extended (e.g., by drill bit 101 of FIG. 1). Capsules 404 may also emulate lost circulation material ("LCM") solids sent downhole to help isolate a wellbore from the formation. In certain examples, capsules 404 may emulate a size, shape, and/or aspect ratio of various solids disposed within the fluids. For example, drill cuttings and/or LCM solids may have various shapes and sizes similar to capsules 404 illustrated in FIG. 4.

Figure 5:
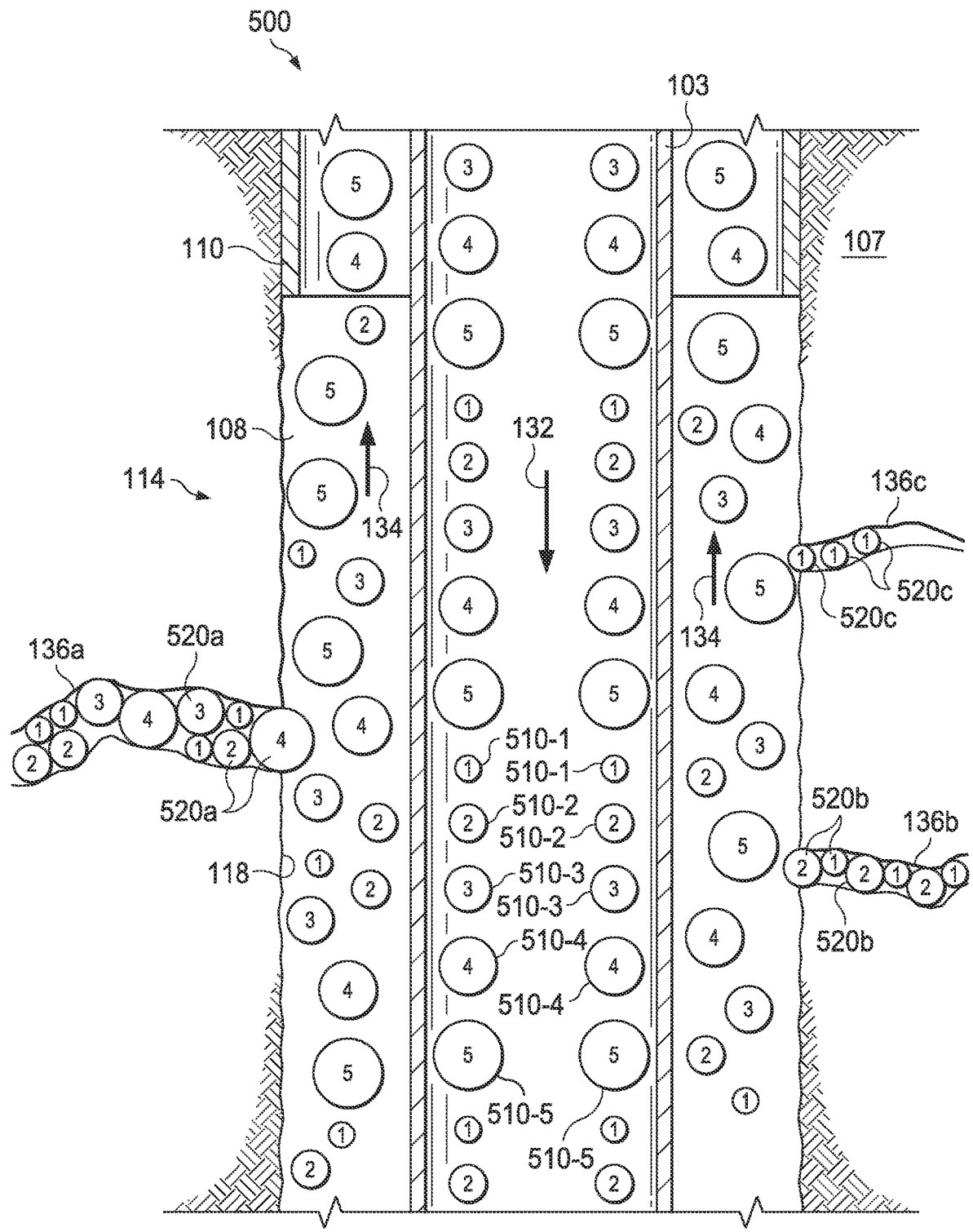
FIG. 5 is an exemplary set of solids disposed in a circulating fluid within a wellbore surrounded by a subterranean formation that includes fractures.

FIG. 5 illustrates exemplary solids disposed in a circulating fluid within a wellbore surrounded by a subterranean formation that includes fractures. As discussed above in reference to FIG. 1, wellbore 114 may be surrounded by formation 107, which may contain fractures 136 (e.g., fractures 136a, 136b, and 136c). The portion of wellbore 114 illustrated in view 500 includes a short length of casing string 110, but is otherwise open hole. As in FIG. 1, the circulating fluid in FIG. 5 flows in drill string 103 in a downhole direction indicated by fluid flow 132. After emerging from drill string 103 further downhole (e.g., through nozzles of drill bit 101, not shown), the fluid flows in annulus 108 in an uphole direction illustrated by fluid flow 134.

As shown, various solids 510 may be disposed within the circulating fluid in wellbore 114. In certain embodiments, a non-uniform assortment of solids varying in size, shape, and/or density may be used. For example, as shown in FIG. 5, solids 510 form a non-uniform assortment of solids varying in size. In FIG. 5, each solid 510 is labeled according to its size, where 1 signifies a very small solid, 2 signifies a slightly larger solid, and so on up to 5, which signifies the largest of solids 510 shown in FIG. 5. Certain solids 510 are labeled with reference signs denoting the size of the solids (e.g. solids 510-1 are size 1, solids 510-2 are size 2, etc.). To reduce clutter with the large number of solids 510 shown in FIG. 5, certain solids 510 do not include reference signs. The relative size differences reflected by the labels on solids 510 differentiates smaller solids 510 (e.g., solids 510-1, 510-2, etc.) from larger solids 510 (e.g., solids 510-4, 510-5, etc.). However, neither solids 510 nor other elements shown in FIG. 5 (e.g., drill string 103, wellbore 114, fractures 136, etc.) are drawn to scale relative to one another.

Solids 510 may include any solids suitable for circulation with a circulating fluid in a wellbore. For example, solids 510 may include drill cuttings, LCM solids, MEMS devices, and/or other solids. Certain solids 510 may be configured to have a particular density or to fit within a particular density range. As such, certain solids 510 may have a density allowing them to be suspended in a particular fluid disposed in or around wellbore 114 or formation 107. For example, solids may be suspended within a hydrocarbon fluid (e.g., oil, gas, etc.), water, drilling mud, completion fluid, cement, or any other suitable fluid. When a solid is suspended within a fluid, the solid may have a similar density as the fluid such that the solid does not substantially float or sink within a volume of the fluid. When the solid is suspended within the fluid, the solid may naturally follow the flow of the fluid as the fluid is pumped downhole (e.g., following fluid flow 132), as the fluid circulates uphole (e.g., following fluid flow 134), and as the fluid otherwise flows within formation 107. For example, solids suspended within a circulating fluid may enter fractures 136 as the circulating fluid flows into fractures 136.

Certain solids 510 may also be a particular size or may fit within a particular size range. For example, solids 510 may be sized and/or shaped to traverse drill string 103 and be ejected out of nozzles on drill bit 101. Solids 510 may also be sized and shaped to facilitate coating sidewall 118 and/or plugging one or more fractures 136. For example, certain solids 510 may be small enough to fit within particular fractures 136 (e.g., fracture 136a) and thus may tend to accumulate in the particular fractures 136, eventually plugging up the fractures. At the same time, the same solids 510 that fit in larger fractures may be too large to fit in smaller fractures 136 (e.g., fracture 136c) and may be carried past the smaller fractures by fluid flow 134.

In certain examples, solids 510 may include drill cuttings. For example, when drill bit 101 (not shown) cuts segments of earth (e.g., rock) or other material from formation 107, a drill cutting may become disposed in circulating fluid to be carried to well surface 106 by fluid flow 134. As many drill cuttings are removed from formation 107 and caused to enter the circulating fluid in wellbore 114, wellbore 114 may be lengthened.

In certain examples, solids 510 may include LCM solids. Various types of LCM solids may be added to the circulating fluid before the circulating fluid enters drill string 103. LCM solids may facilitate sealing parts of formation 107 that are subject to fluid loss due to being weak, porous, and/or fractured. For example, LCM solids may help isolate formation 107 from fluids in wellbore 114 by plugging or helping plug fractures 136. Similarly, LCM solids may facilitate the creation of a filter cake (not shown) along sidewall 118 to further isolate formation 107 from the fluids circulating in wellbore 114.

FIG. 5 illustrates how solids, including LCM solids, may plug fractures 136 and otherwise isolate formation 107 from wellbore 114. As shown in FIG. 5, fractures 136 each capture multiple solids 520 from fluid flow 134. As shown, solids 510 that are captured by fracture 136a may be referred to as solids 520a (e.g., solids 520a-1 for solids of size 1, solids 520a-2 for solids of size 2, etc.). Similarly, solids 510 that are captured by fracture 136b may be referred to as solids 520b (e.g., solids 520b-1 for solids of size 1, solids 520b-2 for solids of size 2, etc.). Solids 510 that are captured by fracture 136c may be referred to as solids 520c. As shown, because fracture 136c is relatively narrow, solids 520c may include only solids of size 1. Larger solids such as solids 510-2 through 510-5 may not fit in fracture 136c. Accordingly, larger solids may continue to be carried uphole by fluid flow 134. Fractures 136a and 136b are wide enough to fit larger solids. For example solids 520b within fracture 136b include solids 520b-1 of size 1 as well as solids 520b-2 of size 2. Similarly, solids 520a within fracture 136a include solids 520a-1 of size 1, 520a-2 of size 2, 520a-3 of size 3, and solids 520a-4 of size 4. Thus, fracture 136a may be large enough to capture any size of solid except solids 510-5 of size 5.

As shown in FIG. 5, each of fractures 136 may become substantially plugged by solids 520 after fluid flow 134 has carried past a sufficient number of solids 510 past to fill and plug fractures 136. However, as fractures 136 capture solids 520 with particular physical characteristics, such as solids below a size threshold of what will fit in a particular fracture 136, the variety of solids 510 remaining in fluid flow 134 may be altered. For example, as shown in FIG. 5, a wider assortment of solids 510 may be present in fluid flow 132 after entering drill string 103 than the assortment that will emerge from wellbore 114 from fluid flow 134 after circulation. Specifically, fluid flow 134 may have fewer solids 510 that are relatively small (e.g., solids 510-1, 510-2 and 510-3) because the smaller solids 510 are captured by fractures 136 and remain in fractures 136 while larger solids (e.g., solids 510-4 and 510-5) continue with fluid flow 134.

A consistently wide variety of LCM solids may facilitate proper plugging of fractures as the fractures form and develop. For example, when too few smaller LCM solids are disposed in the circulating fluid, the larger LCM solids may fail to properly plug fractures because too few LCM solids fit in the fractures. Conversely, when too few larger LCM solids are disposed in the circulating fluid, the smaller LCM solids may fail to properly plug the fractures because the smaller LCM solids do not properly accumulate in the fractures (e.g. by becoming stuck due to a tighter fit). Accordingly, it may be desirable to maintain a particular mix of LCM solids in the circulating fluid so that fractures of various sizes can be plugged quickly and properly as hydrocarbon production proceeds. However, maintaining a desired variety of LCM solids may present challenges. For example, determining even a rudimentary inventory of LCM solids emerging from a wellbore may be difficult because of the large number and small size of the LCM solids, as well as because of other solids (e.g., drill cuttings) intermixed with the LCM solids within the circulating fluid in which the LCM solids are disposed. Determining characteristics of fractures in the formation may provide a means for determining which LCM solids a formation has captured and predicting which LCM solids the formation may capture in the future. For example, characterizing the fractures of a formation may reveal what sizes of LCM solids are being captured by the fractures as well as a desirable mix of LCM solids that may be disposed within wellbore 114 at any particular time.

One way to characterize fractures and thereby determine which LCM solids have been captured by fractures in a wellbore is by use of MEMS devices. Accordingly, in certain embodiments, solids 510 may include MEMS devices. Just as other solids 510 (e.g., LCM solids, drill cuttings, etc.) may vary in size, shape, and/or density, MEMS devices included in solids 510 may also include a non-uniform assortment of MEMS devices varying in size, shape, and/or density, as illustrated in FIG. 4. As described in FIG. 4, certain MEMS devices within the non-uniform assortment may be configured to emulate one or more physical attributes associated with particular solids or fluids. For example, MEMS devices within the non-uniform assortment may be configured to emulate other solids 510 or fluids disposed in wellbore 114. By emulating solids 510, MEMS devices may behave similarly or identically with the solids they emulate.

When MEMS devices emulating particular physical attributes of an LCM solid are determined to be captured by fractures, it may be inferred that similar LCM solids have also been captured by the fractures. For example, among other types of solids, solids 510 may include five sizes of LCM solids with a spherical shape and a low density. For example, solids 510 may include 0.5 millimeter (mm) LCM solids, 1 mm LCM solids, 5 mm LCM solids, 10 mm LCM solids, and 50 mm LCM solids. Accordingly, solids 510 may also include MEMS devices with a similar spherical shape and a similar low density in the same five sizes. As solids 510, including the five sizes of LCM solids and the MEMS devices emulating the five sizes of LCM solids, are circulated, certain LCM solids and MEMS devices may be captured by one or more fractures 136. For example, in FIG. 5, the five sizes of LCM solids and MEMS devices may be shown by solids 510-1 through 510-5. As shown in FIG. 5, many smaller LCM solids and MEMS devices (e.g., solids 510-1 and 510-2) may be captured by fractures 136. For example, several solids 520c-1 may be captured within fracture 136c, several solids 520b-1 and 520b-2 are captured within fracture 136b, and several solids 520a-1 and 520a-2 are captured within fracture 136a. Fewer mid-sized LCM solids and MEMS devices (e.g., solids 510-3 and 510-4) may be captured by fractures 136. For example, no solids 510-3 or 510-4 are captured by fractures 136c or 136b, and only a few are captured by fracture 136a. In FIG. 5, no solids 510-5 may be captured by any fracture. Accordingly, all of the 50 mm MEMS devices, as well as a large portion of the 10 mm and 5 mm MEMS devices may continue circulating up to well surface 106.

Subsequently, as described in relation to FIG. 2 above, MEMS scanner 212 may scan designators of the subset of MEMS devices emerging from wellbore 114 without being captured by fractures 136. MEMS analysis subsystem 202 may receive the designators of the subset and compare the subset with the set of MEMS devices that originally entered drill string 103 to identify MEMS devices present in the set but missing from the subset. MEMS analysis subsystem 202 may also determine, based on the MEMS devices identified to be missing from the subset (e.g., the MEMS devices captured by fractures 136), a size threshold associated with a maximum size of the MEMS devices missing from the subset. For example, MEMS analysis subsystem 202 may determine that at least one fracture is about 10 mm wide because some 10 mm MEMS devices (e.g., solids 320a-4) are missing from the subset. MEMS analysis subsystem 202 may also infer that there may be additional smaller fractures because many 0.1 mm and 1 mm MEMS devices (e.g., solids 320-1 and 320-2) are also missing from the subset. MEMS analysis subsystem 202 may also infer that there is no fracture in wellbore 114 that exceeds 50 mm in width because zero or substantially zero 50 mm MEMS devices (e.g., solids 310-5) may be missing from the subset. Accordingly, based on the size threshold of the MEMS devices present in the set but missing from the subset, MEMS analysis subsystem 202 may determine that at least one fracture is present in wellbore 114 and may determine an approximate size of the fracture to be greater than 10 mm and less than 50 mm.

Because the MEMS devices emulating the various sizes and types of LCM solids may be captured by fractures 136 in a similar or identical manner as the LCM solids themselves, MEMS analysis subsystem 202 may also infer information about the LCM solids from the subset of MEMS devices detected. For example, when MEMS analysis subsystem 202 determines that many MEMS devices less than a size threshold (e.g., 10 mm) have been captured, MEMS analysis subsystem 202 may infer that similarly sized LCM solids may have also been captured. Accordingly, additional LCM solids may be introduced into fluid flow 132 based on the subset of MEMS devices and/or the characteristics of the fracture determined by MEMS analysis subsystem 202. For example, additional LCM solids less than the size threshold (e.g., smaller than 10 mm) may be introduced into fluid flow 132 to maintain the desired wide variety of LCM material in the circulating fluid.

In some examples, MEMS analysis subsystem 202 may be able to infer additional information from the subset of MEMS devices emerging from wellbore 114 in any manner that suits a particular embodiment. For example, in certain embodiments, designators of MEMS devices included in solids 510 may include unique serial numbers and/or time stamps known to MEMS analysis subsystem 202. When MEMS devices having a particular place in a sequence (e.g., as determinable by the serial number and/or timestamp of the MEMS devices) are determined to be missing from the subset of MEMS devices emerging from wellbore 114, MEMS analysis subsystem 202 may determine other characteristics about fractures such as approximate locations of the fractures, timing characteristics associated with the fractures (e.g., when the fractures were created), whether a fracture is a breathing fracture, and other characteristics of the fracture.

"Breathing fractures" may refer to fractures within subterranean formations that receive circulating fluid when a hydrostatic pressure of circulating fluid against the formation exceeds a fracture collapse pressure of the breathing fracture, and that give back circulating fluid otherwise. For example, in a breathing fracture, circulating fluid may flow back into the formation when the hydrostatic pressure exerted by the circulating fluid against the formation is less than the fracture collapse pressure. A breathing fracture may be referred to as "open" when hydrostatic pressure is sufficiently high to cause the breathing fracture to receive circulating fluid. The breathing fracture may be referred to as "closed" when the hydrostatic pressure is lower and the circulating fluid flows back into the formation. The fracture collapse pressure may be related to the equivalent effective density of the circulating fluid. The fracture collapse pressure may be determined by taking into account various parameters such as the weight of the circulating fluid, the depth of the fracture, the pressure drop in the annulus at the depth of the fracture, the characteristics of the formation, and other suitable parameters. In some examples, a breathing fracture may be open when circulating fluid pumps are engaged and closed when the circulating fluid pumps are disengaged.

Breathing fractures may cause problems for subterranean operations in a similar manner as other types of fractures. However, breathing fractures may also be symptomatic of significant risk to the operations in the wellbore. For example, although breathing fractures may be difficult to detect and may be of minor consequence in and of themselves, breathing fractures may lead to more significant fractures when left untreated. Accordingly, characterizing breathing fractures within the wellbore may provide valuable information for decision making regarding subterranean operations. For example, early characterization of breathing fractures before the breathing fractures develop into larger problems may allow operators to take appropriate measures to protect the integrity of the wellbore, the operations within the wellbore, the production schedule, and/or the personnel associated with production of hydrocarbons in the wellbore. In certain examples, as described above in relation to FIG. 5, operators may attempt to treat the breathing fracture by plugging it with appropriate LCM solids based on a characterization of the size of the fracture performed using a non-uniform assortment of MEMS devices emulating various LCM solids.

Like breathing fractures, formation kicks are another undesirable phenomenon that may occur in a wellbore during subterranean hydrocarbon production. Formation kicks may occur when a region of a formation surrounding a wellbore has greater pressure than the hydrostatic pressure from the circulating fluid in the wellbore. The high pressure region of the formation may be exposed by drilling through or into the region, or may develop as pressure increases over time. The symptoms of formation kicks may be similar to the symptoms of breathing fractures. Specifically, both formation kicks and breathing fractures may expel a volume of fluid into the wellbore which eventually is circulated to the well surface. In some examples, a breathing fracture may expel a volume of circulating fluid that was previously received by the formation into the wellbore. In other examples, a formation kick may expel natural subterranean fluids from the formation (e.g., water, hydrocarbon fluids, etc.) into the wellbore.

Distinguishing between a breathing fracture and a formation kick may be difficult because the primary symptom of each phenomenon—an unexpected volume of fluid—may be similar. However, distinguishing between breathing fractures and formation kicks may be important because proper treatment of breathing fractures may be distinct from proper treatment of formation kicks.

Figure 6A:
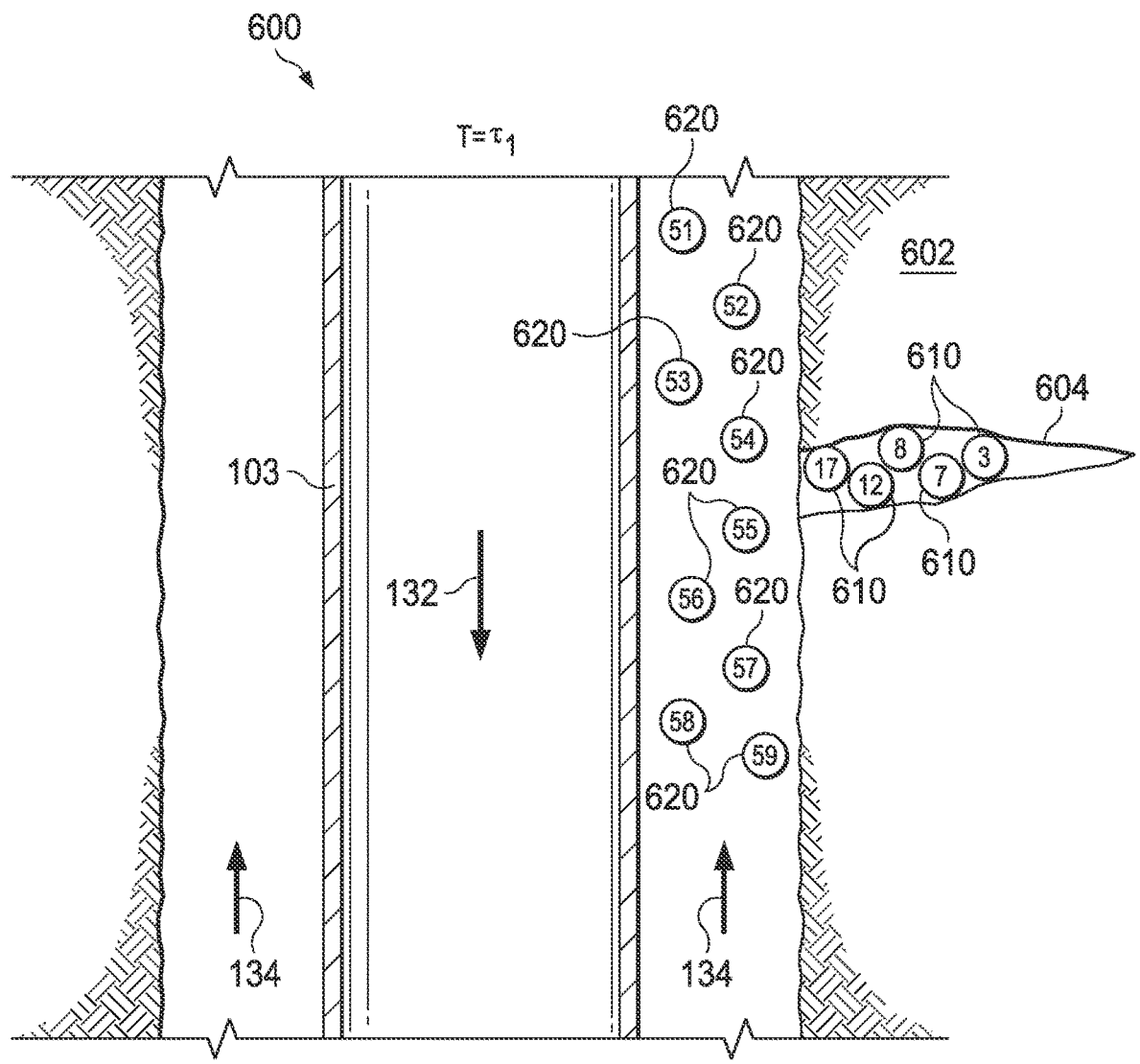
FIG. 6A is an exemplary set of solids disposed in a circulating fluid within a wellbore surrounded by a subterranean formation that includes a breathing fracture.
Figure 6B:
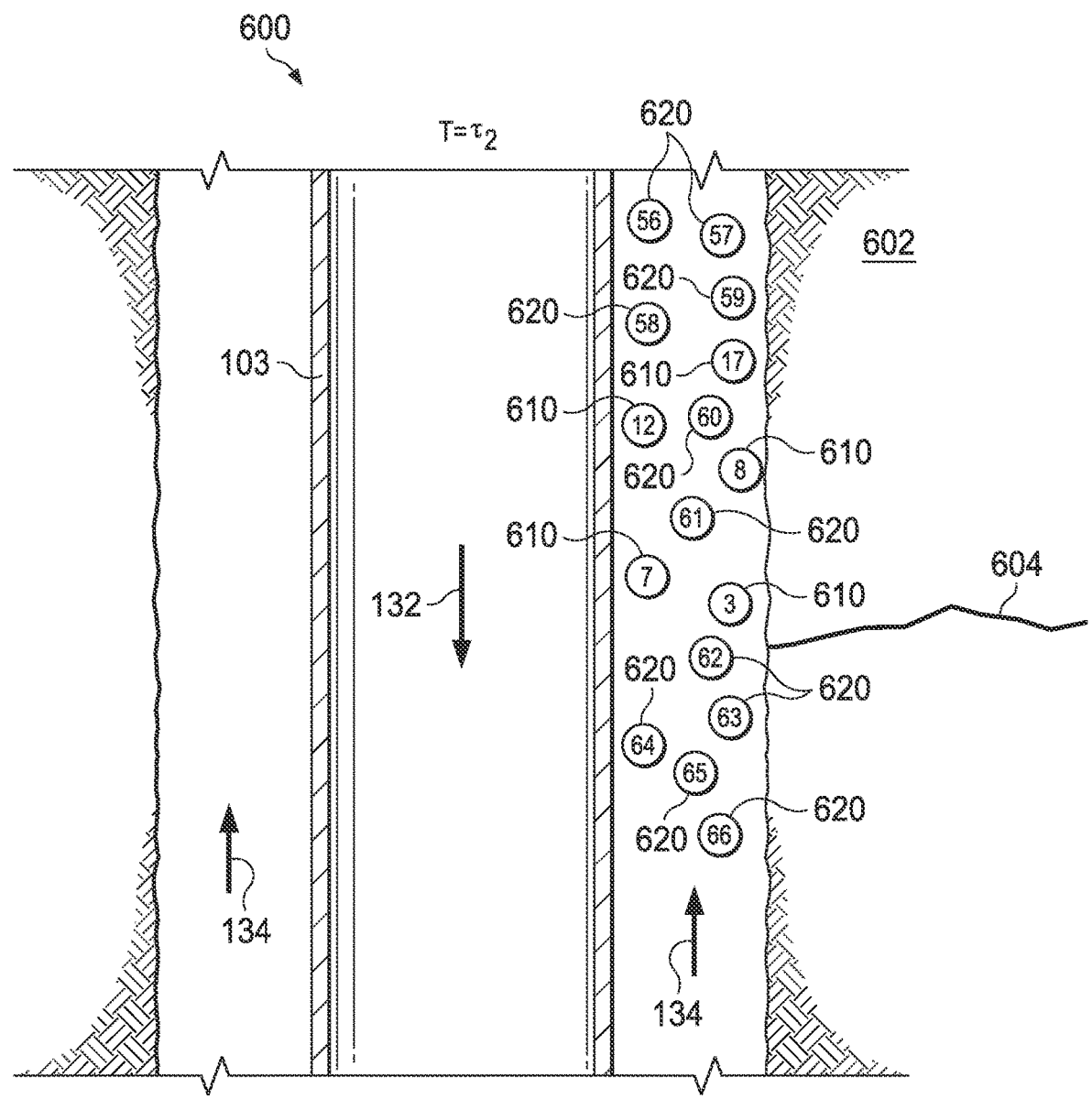
FIG. 6B is an exemplary set of solids disposed in a circulating fluid within a wellbore surrounded by a subterranean formation that includes a breathing fracture.

Turning to FIGS. 6A and 6B, referred to collectively as FIG. 6, views of circulating fluid in a wellbore are illustrated. Specifically, FIG. 6A illustrates exemplary solids disposed in a circulating fluid surrounded by a subterranean formation that includes a breathing fracture. As shown, FIG. 6 illustrates wellbore 600 and breathing fracture 604 at two different moments in time, $t_1$ and $t_2$. FIG. 6A illustrates wellbore 600 at time $T=t_1$. At time $t_1$, sufficient hydrostatic pressure from the circulating fluid in wellbore 600 may exist to open breathing fracture 604. For example, at time $t_1$, circulating fluid pumps at the well surface (not shown) may be engaged. Meanwhile, FIG. 6B illustrates wellbore 600 at time $T=t_2$, which may be later than time $t_1$. At time $t_2$, the hydrostatic pressure from circulating fluid in wellbore 600 may be insufficient to open breathing fracture 604, and breathing fracture 604 may thus be closed. For example, at time $t_2$, the circulating fluid pumps may be disengaged.

As shown in FIG. 6, circulating fluid is pumped downhole in drill string 103 in the direction of fluid flow 132. At a downhole point (not shown), the circulating fluid may exit drill string 103 (e.g., through nozzles of a drill bit, not shown) and may flow in an uphole direction indicated by fluid flow 134. In FIG. 6, subterranean formation 602 may surround wellbore 600. Formation 602 may include breathing fracture 604. As discussed above in reference to FIG. 5, various solids including drill cuttings, LCM solids, and MEMS devices may be disposed in the circulating fluid flowing in wellbore 600. However, whereas FIG. 5 illustrated various types of solids with various physical characteristics, the only solids shown in FIG. 6 are MEMS devices. Specifically, for descriptive clarity in FIG. 6, MEMS devices 610 and 620 are shown as being approximately uniform in size, shape, and other physical characteristics. However, it is noted that in various embodiments, an assortment of solids not expressly shown or discussed in reference to FIG. 6 may be disposed in the circulating fluid of FIG. 6 and may perform similar functions as described in relation to FIGS. 3 through 5. Additionally, although not shown in FIG. 6, it is noted that MEMS devices 610 and 620 may include a non-uniform assortment of MEMS devices varying in size, shape, density, and/or other physical parameters in various embodiments.

In FIG. 6, MEMS devices 610 and 620 are each labeled with a number. For example, MEMS devices 620 are labeled with numbers such as 3, 7, 8, 12, and 17. Similarly, MEMS devices 610 are labeled with numbers such as 51 through 59. The number labeled on each MEMS device 620 and 610 may represent a serial number associated with a designator of each MEMS device. For example, MEMS devices 620 may be machine-scannable to read out designators including respective serial numbers: 3, 7, 8, 12, and 17. Each MEMS device 610 and 620 may be referred to specifically by its serial number. For example, the MEMS device labeled with serial number 3 may be referred to as MEMS device 620-3 and the MEMS device labeled with serial number 51 may be referred to as MEMS device 610-51.

The serial numbers of MEMS devices 610 and 620 may be associated with an order and/or a time at which MEMS devices 610 and 620 entered drill string 103 within wellbore 600. For example, MEMS devices 610 and 620 may enter drill string 103 in the order indicated by the serial numbers such that, of the MEMS devices shown in FIG. 6, MEMS device 620-3 entered first, MEMS device 620-7 entered second, and so on until MEMS device 610-59, which entered last. In the embodiment of FIG. 6, other MEMS devices not shown (e.g., MEMS devices with serial numbers of 1, 2, 4, 5, 6, 9, etc.) may also enter wellbore 600 in serial number order. For example, in the embodiment of FIG. 6, 100 MEMS devices with serial numbers 1 through 100 may have entered wellbore 600 in serial number order, even though only particular MEMS devices are shown near breathing fracture 604 at time $t_1$ (see FIG. 6A) and time $t_2$ (see FIG. 6B).

In various embodiments, more or fewer MEMS devices may enter wellbore 600 with any serial numbers that suit a particular embodiment. For example, serial numbers may be unique or non-unique. Serial numbers may be in numerical order or may be random or out of order. For example, the serial numbers of MEMS devices 610 and 620 in FIG. 6 are shown to enter wellbore 600 in serial number order for descriptive clarity. However, in other embodiments, MEMS devices disposed in circulating fluid may be preprogrammed with serial numbers such that it would be impractical or difficult to arrange the MEMS devices to enter wellbore 600 in serial number order. In such embodiments, a MEMS scanner (e.g., MEMS scanner 210 in FIG. 2) may scan the designator of each MEMS device as the MEMS device enters wellbore 600 and communicate a serial number associated with the designator to a MEMS analysis subsystem (e.g., MEMS analysis subsystem 202 in FIG. 2). The MEMS analysis subsystem may use the serial numbers received from the MEMS scanner to track the order in which the MEMS devices entered wellbore 600. In this way, the order that each MEMS device entered wellbore 600 may be accounted for irrespective of the actual serial numbers programmed into each MEMS device. Accordingly, the MEMS analysis subsystem may perform fracture characterization as described herein without arranging the MEMS devices to enter wellbore 600 in any particular order.

As shown in FIG. 6A, a circulating fluid pump may be engaged at time $t_1$, generating a hydrostatic pressure of the circulating fluid against formation 602 greater than a fracture collapse pressure of breathing fracture 604. Accordingly, as shown, breathing fracture 604 may open to receive circulating fluid, including MEMS devices 620, which are disposed in the circulating fluid. Prior to time $t_1$, certain MEMS devices (e.g., MEMS devices having serial numbers 1, 2, 4-6, 9-11, 13-16, and 18-50, not shown) may have been carried past breathing fracture 604 by fluid flow 134. Meanwhile, MEMS devices 620 (e.g., MEMS devices 620-3, 620-7, 620-8, 620-12, and 620-17) may have been captured by breathing fracture 604, as shown. As breathing fracture 604 fills with circulating fluid, MEMS devices, and/or other solids (not shown), MEMS devices 610 may be carried past breathing fracture 604. For example, at time $t_1$, FIG. 6A illustrates that MEMS devices 610-51 through 610-59 are near breathing fracture 604. Additionally, MEMS devices with serial numbers 60 and higher may be downhole in fluid flow 134, in fluid flow 132 within drill string 103, and/or at the well surface awaiting entrance into wellbore 600.

After time $t_1$, the hydrostatic pressure in wellbore 600 may decrease. For example, after time $t_1$ a circulating fluid pump generating the hydrostatic pressure may be shut off or disengaged. Accordingly, sometime after time $t_1$, the hydrostatic pressure in wellbore 600 may be no longer be sufficient to continue holding open breathing fracture 604. As breathing fracture 604 closes, circulating fluid may flow back into formation 602 carrying any solids that may be disposed within the circulating fluid.

Along with FIG. 6A, FIG. 6B illustrates exemplary solids disposed in a circulating fluid within a wellbore surrounded by a subterranean formation that includes a breathing fracture. Specifically, FIG. 6B illustrates wellbore 600 at time $t_2$, which may be some time after time $t_1$. As shown in FIG. 6B, breathing fracture 604 is closed at time $t_2$ and the circulating fluid that breathing fracture 604 captured when it was open (see FIG. 6A) has flowed back into wellbore 600, recombining MEMS devices 620 with MEMS devices 610 in fluid flow 134. However, because MEMS devices 620 were captured out of fluid flow 134 for a period of time, MEMS devices 620 may be substantially out of order in relation to MEMS devices 610 in fluid flow 134. Specifically, MEMS devices 620 (e.g., MEMS devices 620-3, 620-7, 620-8, 620-12, and 620-17), which all have serial numbers less than 18, may now be intermixed in fluid flow 134 with MEMS devices 610 (e.g., MEMS devices 610-56 through 610-66), which all have serial numbers above 55.

After time $t_2$, each of the MEMS devices 620 and 610 may eventually be carried by fluid flow 134 to emerge from wellbore 600, where a MEMS scanner (e.g., MEMS scanner 212 in FIG. 2) may scan the designators, including the serial numbers, of all of MEMS devices 620 and 610. A MEMS analysis subsystem (e.g., MEMS analysis subsystem 202 in FIG. 2) may receive the serial numbers and analyze the order that MEMS devices 620 and 610 emerged from wellbore 600 after circulation. The MEMS analysis subsystem may determine that MEMS devices 620 are substantially out of order with MEMS devices 610. The MEMS analysis subsystem may have an order tolerance such that every MEMS device is not expected to arrive at the surface in precisely the same order the MEMS device entered wellbore 600. However, the MEMS analysis subsystem may be configured to detect when MEMS devices are substantially out of order. For example, the MEMS analysis subsystem may ignore MEMS devices that are out of order by less than a maximum number of MEMS devices (e.g., 20). Thus, if the MEMS device with serial number 11 emerges from wellbore 600 prior to the MEMS device with serial number 2, the MEMS analysis subsystem may not determine that the MEMS device with serial number 11 is substantially out of order. However, when MEMS device 610-56 emerges from wellbore 600 prior to MEMS device 620-8, the MEMS analysis subsystem may determine that MEMS device 620-8 is substantially out of order. In various embodiments, a maximum number of MEMS devices to be out of order may not be used or may be less than or greater than 20 as suits a particular embodiment.

Similarly, the MEMS analysis subsystem may ignore MEMS devices that are out of order when only a small number of MEMS devices are out of order (e.g., less than 4). Thus, if only two MEMS devices are detected to be more than 20 MEMS devices out of order, the MEMS analysis subsystem may not determine that the two MEMS devices are substantially out of order. However, when all five MEMS devices 620 are more than 20 MEMS devices out of order, the MEMS analysis subsystem may determine that MEMS devices 620 are substantially out of order. In various embodiments, the number of MEMS devices to be out of order may be less than or greater than 4 as suits a particular embodiment. Additionally, in various embodiments, the MEMS analysis subsystem may analyze more or fewer characteristics of the order of MEMS devices in determining whether particular MEMS devices are substantially out of order.

Once MEMS devices are determined to be substantially out of order, the MEMS analysis subsystem may determine a characteristic of a fracture based on the substantially out of order MEMS devices. For example, MEMS devices 620 may be determined to be substantially out of order in the example of FIG. 6 because five MEMS devices 620 are each out of order by more than 20 MEMS devices. Accordingly, the MEMS analysis subsystem analyzing MEMs devices 620 and 610 may determine that breathing fracture 604 is present in wellbore 600. Specifically, the MEMS analysis subsystem may infer that breathing fracture 604 captured MEMS devices 620 for a period of time and then expelled them back into wellbore 600, thus causing MEMS devices 620 to become substantially out of order with MEMS devices 610. The MEMS analysis subsystem may further determine an approximate size of breathing fracture 604 based on the number, size, shape, and/or density of MEMS devices 620, using techniques described above with reference to FIG. 5. The MEMS analysis subsystem may further determine an approximate location of breathing fracture 604 within wellbore 600 based on designators of MEMS devices 610 that are intermixed with substantially out of order MEMS devices 620. For example, the MEMS analysis subsystem may track an approximate depth that MEMS devices 610 are expected to have at various times. Thus, the MEMS analysis subsystem may be able to determine an approximate depth of MEMS devices 610-56 through 610-66 when circulating fluid pumps are disengaged. When MEMS devices 620 are then determined to be intermingled with MEMS devices 610-56 through 610-66, MEMS analysis subsystem may determine that a breathing fracture is present at the approximate depth of MEMS devices 610 at the time the circulating fluid pumps were disengaged.

The MEMS analysis subsystem may also help distinguish breathing fractures from formation kicks. While both breathing fractures and formation kicks manifest themselves by an influx of additional fluid in wellbore 600, only breathing fractures may manifest themselves with a simultaneous influx of substantially out of order MEMS devices into wellbore 600. Accordingly, in certain embodiments, a MEMS analysis subsystem may be configured to distinguish whether superfluous fluid associated with ongoing subterranean operations in wellbore 600 is caused by a breathing fracture or a formation kick by determining whether the superfluous fluid is accompanied by substantially out of order MEMS devices.

Systems and methods for formation characterization in a subterranean formation are disclosed herein. A set of MEMS devices may be disposed in a circulating fluid. Each MEMS device in the set may have a machine-scannable designator. A MEMS scanner may be configured to scan the designator of a MEMS device in response to circulation of the circulating fluid in a wellbore surrounded by the formation. A MEMS analysis subsystem communicatively coupled with the MEMS scanner may store the designator of each MEMS device in the set, detect a subset of MEMS devices by receiving the designators of MEMS devices from the MEMS scanner, and determine a characteristic of the formation based on the subset of MEMS devices.

Embodiments disclosed herein include:

A. A formation characterization system including a set of microelectromechanical system (MEMS) devices disposed in a circulating fluid, each MEMS device in the set having a machine-scannable designator, a MEMS scanner to scan the designator of a MEMS device in response to circulation of the circulating fluid in a wellbore, and a MEMS analysis subsystem communicatively coupled with the MEMS scanner and configured to store the designator of each MEMS device in the set of MEMS devices, detect a subset of MEMS devices from the set of MEMS devices by receiving the designator of each MEMS device in the subset from the MEMS scanner, and determine a characteristic of a fracture within a subterranean formation surrounding the wellbore based on the subset of MEMS devices.

B. A method including storing a designator of each microelectromechanical system (MEMS) device in a set of MEMS devices disposed in a circulating fluid, the designator of each MEMS device in the set being machine-scannable from each MEMS device, detecting a subset of MEMS devices from the set of MEMS devices by receiving the designator of each MEMS device in the subset from a MEMS scanner scanning the designators in response to circulation of the circulating fluid in a wellbore, and determining a characteristic of a fracture within a subterranean formation surrounding the wellbore based on the subset of MEMS devices.

C. A non-transitory computer-readable medium including instructions stored therein, the instructions readable by a processor and, when read and executed, configured to cause the processor to store a designator of each microelectromechanical system (MEMS) device in a set of MEMS devices disposed in a circulating fluid, the designator of each MEMS device in the set being machine-scannable from each MEMS device, detect a subset of MEMS devices from the set of MEMS devices by receiving the designators of each MEMS device in the subset from a MEMS scanner scanning the designators in response to circulation of the circulating fluid in a wellbore, and determine a characteristic of a fracture within a subterranean formation surrounding the wellbore based on the subset of MEMS devices.

Each of embodiments A, B, and C may have one or more of the following additional elements in any combination: Element 1: wherein the set of MEMS devices includes MEMS devices in a non-uniform assortment, the non-uniform assortment of MEMS devices varying in at least one of size, shape, and density, each MEMS device in the non-uniform assortment of MEMS devices emulating a physical characteristic associated with a lost circulation material (LCM) solid. Element 2: wherein the LCM solid is selected based on the determined characteristic of the fracture. Element 3: wherein the MEMS analysis subsystem is further configured to compare the set of MEMS devices with the subset of MEMS devices to identify MEMS devices present in the set, but missing from the subset, and determine, based on the identified MEMS devices missing from the subset, a size threshold associated with a maximum size of the MEMS devices missing from the subset, wherein determining the characteristic of the fracture is further based on the size threshold and the characteristic is associated with a size of the fracture. Element 4: wherein the designator of each MEMS device in the set of MEMS devices is associated with an order in which each MEMS device first enters the wellbore, the MEMS analysis subsystem is further configured to determine, based on the designators of the subset of MEMS devices, that one or more MEMS devices within the subset is substantially out of order compared to a remainder of MEMS devices in the subset, and determining the characteristic of the fracture is further based on the one or more substantially out of order MEMS devices and the characteristic is that the fracture is a breathing fracture. Element 5: wherein determining the characteristic of the fracture includes determining an approximate location of the breathing fracture within the wellbore. Element 6: wherein the MEMS analysis subsystem is further configured to distinguish, based on the subset of MEMS devices, between breathing from the breathing fracture and a formation kick from the formation.

Although the present disclosure and its advantages have been described in detail, it should be understood that various changes, substitutions and alterations can be made herein without departing from the spirit and scope of the disclosure as defined by the following claims. For example, embodiments relating to detecting fractures within a formation by detecting MEMS devices missing from a subset of MEMS devices may be combined with embodiments relating to detecting that MEMS devices have been affected by characteristics of the formation because one or more units of the designators is lost. Similarly, these embodiments may be combined with embodiments relating to detecting out-of-order MEMS devices that indicate breathing fractures within a formation and/or other embodiments described herein.

What is claimed is:

1. A formation characterization system comprising:
   a set of microelectromechanical system (MEMS) devices disposed in a circulating fluid in a wellbore, each MEMS device in the set having a machine-scannable designator and emulating a physical characteristic associated with a lost circulation material (LCM) solid;
   a MEMS scanner to scan the designator of a MEMS device of the set of MEMS devices in response to circulation of the circulating fluid; and
   a MEMS analysis subsystem communicatively coupled with the MEMS scanner and configured to:
      store the designator of each MEMS device in the set of MEMS devices;
      detect a subset of MEMS devices from the set of MEMS devices by receiving the designator of each MEMS device in the subset from the MEMS scanner; and
      determine a characteristic of a fracture within a subterranean formation surrounding the wellbore based on the subset of MEMS devices.

2. The formation characterization system of claim 1, wherein the set of MEMS devices includes a plurality of MEMS devices in a non-uniform assortment, the non-uniform assortment of MEMS devices varying in at least one of size, shape, and density.

3. The formation characterization system of claim 1, wherein the LCM solid is selected based on the determined characteristic of the fracture.

4. The formation characterization system of claim 1, wherein the MEMS analysis subsystem is further configured to:
   compare the set of MEMS devices with the subset of MEMS devices to identify MEMS devices present in the set, but missing from the subset; and
   determine, based on the identified MEMS devices missing from the subset, a size threshold associated with a maximum size of the MEMS devices missing from the sub set;
   wherein determining the characteristic of the fracture is further based on the size threshold and the determined characteristic is associated with a size of the fracture.

5. The formation characterization system of claim 1, wherein:
   the designator of each MEMS device in the set of MEMS devices is associated with an order in which each MEMS device enters the wellbore;
   the MEMS analysis subsystem is further configured to determine, based on the designators of the subset of MEMS devices, that one or more MEMS devices within the subset is substantially out of order compared to a remainder of MEMS devices in the subset; and
   determining the characteristic of the fracture is further based on the one or more substantially out of order MEMS devices and the determined characteristic is that the fracture is a breathing fracture.

6. The formation characterization system of claim 5, wherein determining the characteristic of the fracture includes determining an approximate location of the breathing fracture within the wellbore.

7. The formation characterization system of claim 5, wherein the MEMS analysis subsystem is further configured to distinguish, based on the subset of MEMS devices, between breathing from the breathing fracture and a formation kick from the formation.

8. A method comprising:
storing in a storage unit of a microelectromechanical system (MEMS) analysis subsystem a designator of each MEMS device in a set of MEMS devices disposed in a circulating fluid in a wellbore, the designator of each MEMS device in the set being machine-scannable from each MEMS device and emulating a physical characteristic associated with a lost circulation material (LCM) solid;
scanning a plurality of designators with a MEMS scanner in response to circulation of the circulating fluid;
detecting with the MEMS analysis subsystem a subset of MEMS devices from the set of MEMS devices from the set of MEMS devices based on the plurality of designators scanned by the MEMS scanner; and
determining a characteristic of a fracture within a subterranean formation surrounding the wellbore based on the subset of MEMS devices.

9. The method of claim 8, wherein the set of MEMS devices includes a plurality of MEMS devices in a non-uniform assortment, the non-uniform assortment of MEMS devices varying in at least one of size, shape, and density.

10. The method of claim 8, wherein the LCM solid is selected based on the determined characteristic of the fracture.

11. The method of claim 8, further comprising:
comparing the set of MEMS devices with the subset of MEMS devices to identify MEMS devices present in the set, but missing from the subset; and
determining, based on the identified MEMS devices missing from the subset, a size threshold associated with a maximum size of the MEMS devices missing from the sub set;
wherein determining the characteristic of the fracture is further based on the size threshold and the determined characteristic is associated with a size of the fracture.

12. The method of claim 8, wherein the designator of each MEMS device in the set of MEMS devices is associated with an order in which each MEMS device first enters the wellbore, the method further comprising:
determining, based on the designators of the subset of MEMS devices, that one or more MEMS devices within the subset is substantially out of order compared to a remainder of MEMS devices in the subset; and
wherein determining the characteristic of the fracture is further based on the one or more substantially out of order MEMS devices and the determined characteristic is that the fracture is a breathing fracture.

13. The method of claim 12, wherein determining the characteristic of the fracture includes determining an approximate location of the breathing fracture within the wellbore.

14. The method of claim 12, further comprising distinguishing, based on the subset of MEMS devices, between breathing from the breathing fracture and a formation kick from the formation.

15. A non-transitory computer-readable medium comprising instructions stored therein, the instructions readable by a processor and, when read and executed, configured to cause the processor to:
store in a storage unit of a microelectromechanical system (MEMS) analysis subsystem a designator of each MEMS device in a set of MEMS devices disposed in a circulating fluid in a wellbore, the designator of each MEMS device in the set being machine-scannable from each MEMS device and emulating a physical characteristic associated with a lost circulation material (LCM) solid;
scan a plurality of designators with a MEMS scanner in response to circulation of the circulating fluid;
detect with the MEMS analysis subsystem a subset of MEMS devices from the set of MEMS devices based on the plurality of designators scanned by the MEMS scanner; and
determine a characteristic of a fracture within a subterranean formation surrounding the wellbore based on the subset of MEMS devices.

16. The non-transitory computer-readable medium of claim 15, wherein the set of MEMS devices includes a plurality MEMS devices in a non-uniform assortment, the non-uniform assortment of MEMS devices varying in at least one of size, shape, and density.

17. The non-transitory computer-readable medium of claim 15, wherein the LCM solid is selected based on the determined characteristic of the fracture.

18. The non-transitory computer-readable medium of claim 15, wherein the instructions, when read and executed, are further configured to cause the processor to:
compare the set of MEMS devices with the subset of MEMS devices to identify MEMS devices present in the set, but missing from the subset; and
determine, based on the identified MEMS devices missing from the subset, a size threshold associated with a maximum size of the MEMS devices missing from the sub set;
wherein the instructions cause the processor to determine the characteristic of the fracture based on the size threshold and the determined characteristic is associated with a size of the fracture.

19. The non-transitory computer-readable medium of claim 15, wherein the designator of each MEMS device in the set of MEMS devices is associated with an order in which each MEMS device first enters the wellbore, the instructions, when read and executed, being further configured to cause the processor to:
determine, based on the designators of the subset of MEMS devices, that one or more MEMS devices within the subset is substantially out of order compared to a remainder of MEMS devices in the subset;
wherein determining the characteristic of the fracture is further based on the one or more substantially out of order MEMS devices and the determined characteristic is that the fracture is a breathing fracture.

20. The non-transitory computer-readable medium of claim 19, wherein the instructions, when read and executed, are further configured to cause the processor to:
distinguish, based on the subset of MEMS devices, between breathing from the breathing fracture and a formation kick from the formation;
wherein determining the characteristic of the fracture includes determining an approximate location of the breathing fracture within the wellbore.

* * * * *